(12) United States Patent
Ong et al.

(10) Patent No.: US 7,406,549 B2
(45) Date of Patent: Jul. 29, 2008

(54) SUPPORT FOR NON-STANDARD DEVICE CONTAINING OPERATING SYSTEM DATA

(75) Inventors: Soo Keong Ong, Bayan Baru (MY); Wei Kee Law, Seremban (MY)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 10/632,241

(22) Filed: Aug. 1, 2003

(65) Prior Publication Data

US 2005/0027908 A1    Feb. 3, 2005

(51) Int. Cl.
G06F 13/12 (2006.01)
(52) U.S. Cl. .............. 710/62; 710/2; 710/300; 710/301; 710/302; 710/313; 710/314; 710/315
(58) Field of Classification Search ........ 710/2, 710/62
See application file for complete search history.

(56) References Cited

U.S. PATENT DOCUMENTS

| | | | |
|---|---|---|---|
| 6,266,724 B1 * | 7/2001 | Harari et al. ............. | 710/301 |
| 6,397,268 B1 * | 5/2002 | Cepulis ................... | 710/8 |
| 6,421,798 B1 * | 7/2002 | Lin et al. ................ | 714/718 |
| 6,735,663 B2 * | 5/2004 | Watts et al. ............. | 710/313 |
| 6,760,785 B1 * | 7/2004 | Powderly et al. ......... | 710/2 |
| 2003/0009654 A1 * | 1/2003 | Nalawadi et al. ......... | 713/1 |
| 2004/0003297 A1 * | 1/2004 | Ma .......................... | 713/300 |
| 2004/0098516 A1 * | 5/2004 | Eidson et al. ............. | 710/1 |
| 2004/0205258 A1 * | 10/2004 | Wilson et al. ............. | 710/1 |
| 2005/0060481 A1 * | 3/2005 | Belonoznik ............... | 710/315 |

OTHER PUBLICATIONS

Harry Newtion, Newton's Telecom Dictionary, Feb. 2002, CMP books, p. 536, Definition of Operating System.*
Ziatech, "ZT 5523 System Master Processor Board—Hardware Manual", Performance Technologies, 90 pgs., Oct. 10, 2002.
Ziatech Corporation, "ZT 5081—CU CompactPCI 14-Slot Development System—User's Manual," 11 pgs., Aug. 17, 1999.

* cited by examiner

Primary Examiner—Niketa I. Patel
(74) Attorney, Agent, or Firm—Blakely, Sokoloff, Taylor & Zafman LLP

(57) ABSTRACT

According to an embodiment of the invention, a method and apparatus for support of a non-standard device containing operating system data are described. According to one embodiment, a circuit comprises a first device that is not compliant with a PCI (peripheral component interconnect) standard, the first device containing operating system data, where the operating system data is not bootable for any non-standard device; a second device that is compliant with the PCI standard, the second device being associated with the operating system data, the association of the second device with the operating system data from the first device enabling the operating system data from the first device to be booted according to the PCI standard; and a memory to receive the operating system data from the first device.

28 Claims, 5 Drawing Sheets

SUPPORT FOR NON-STANDARD DEVICE CONTAINING OPERATING SYSTEM DATA

FIELD

An embodiment of the invention relates to computers in general, and more specifically to support for non-standard devices.

BACKGROUND

In a computer environment, including an embedded computer or other specialized computer system, one or more devices may be connected to a bus. The devices and the bus may operate in compliance with a standard or specification, which may include a PCI (Peripheral Component Interconnect) standard.

However, a device in the environment that does not comply with the bus standard may also contain operational data. In addition, a standard device may operate as a non-standard device because the use of the device is non-complying. The data contained in the non-complying device may be the operating system (OS) for a system. In certain environments, the utilization of the data from the non-complying device or otherwise providing support for a non-standard device may cause complications in system operation, including a need for extensive modification to the BIOS (basic input output system) source code.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
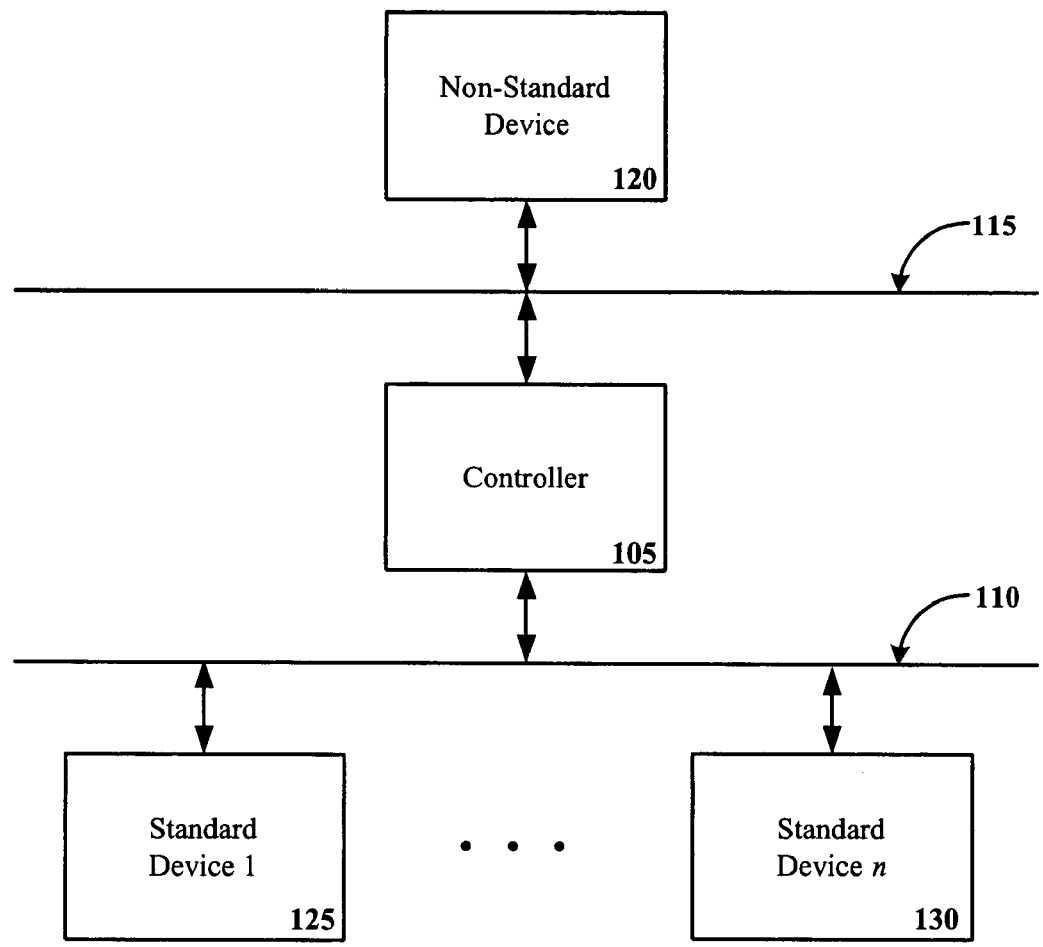
FIG. 1 illustrates an embodiment of device connections.

A method and apparatus are described for provision of support for a non-standard device containing operating system data.

Under an embodiment of the invention, support is provided for a non-standard device that is operated in a standard computer environment. In one example, a system includes one or more standard devices coupled with a standard bus. The system further includes a non-standard device that contains certain data. The system identifies a standard device to associate with the data in order to allow utilization of the data in the system.

A standard that may be utilized in conjunction with an embodiment of the invention includes, but is not limited to, a PCI (Peripheral Component Interconnect) specification. Such specifications include the "PCI Local Bus Specification Rev. 2.1" ("PCI 2.1"), published on Jun. 1, 1995, the "PCI Local Bus Specification Rev. 2.2" ("PCI 2.2"), published on Dec. 18, 1998 and the "PCI Local Bus Specification Rev. 2.3" ("PCI 2.3"), published on Mar. 29, 2002, by the PCI Special Interest Group. Such standards and related details are referred to herein as the PCI local bus specification or the PCI standard.

A non-standard device is a device that does not comply with a particular standard. A non-standard device includes a non-PCI device. A non-PCI device may be a device that is not configurable by configuration space decoding according to the PCI local bus specification. In addition, a standard device can be categorized as a non-standard device if the device is used in a non-standard way according to the applicable standard implementation. In one example, a flash memory may be a device that complies with an ISA (Industry Standard Architecture) bus standard. However, the use of a flash device as a bootable device recognized by the BIOS is non-standard, and thus the flash device is a non-standard device for this purpose.

In one embodiment of the invention, a non-PCI device contains data comprising an OS, with the OS including an OS boot loader. An option-ROM may be created as the OS boot loader, but the option-ROM does not belong to any PCI device. In the embodiment, the option-ROM is used to cause the non-PCI device to be recognized as a standard bootable device, and thus allow the OS to be booted. The term option-ROM (or option ROM or expansion ROM) refers to optional read-only memory, also referred to as expansion memory. PCI Local Bus Specification, revision 2.3, section 6.3, provides additional information regarding this subject. An option-ROM can contain instructions required to properly boot or enable a peripheral device. According to an embodiment of the invention, a PCI device is selected to be associated with the option-ROM data, acting as a temporary target for the option-ROM. The association of the PCI device with data is used to dispatch software or firmware support for the non-PCI device to system memory.

According to an embodiment of the invention, software or firmware support is enabled for a non-standard device, such as a non-PCI device that has PCI option-ROM. The process may allow software component re-use, simplify the BIOS source code, and allow system development without requiring a full understanding of non-standard option-ROM programming.

According to an embodiment of the invention, one or more PCI buses are scanned for all PCI devices to locate a temporary target for option-ROM that does not belong to a PCI device. A suitable PCI device is selected, and the selected PCI device's vendor ID and device ID are assigned to the option-ROM. The data may then be dispatched to memory in the same manner as data from a PCI device.

Each physical PCI device may include multiple functions (generally up to eight different functions) internally, with each function comprising a separate device. Each function may have the same or a different vendor ID and device ID as other functions included in the same physical device. For simplicity in this application, in addition to a physical device, "device" also refers to one of the functions for a physical device.

According to an embodiment of the invention, a device may act as a temporary target for an option-ROM if the device is a PCI compliant device without a physical ROM device. A suitable PCI device may have the following characteristics:

(1) The device is not a display adapter. A display adapter usually has associated PCI option-ROM, and thus the display adapter cannot provide a unique identifier for option-ROM in a non-PCI device.

(2) The device is not a PCI bridge. A PCI bridge device generally does not require a PCI option-ROM, thereby making the device unsuitable for identifying option-ROM.

(3) The device does not have on-board expansion ROM.

(4) The device is not already marked as used. According to an embodiment of the invention, selected PCI devices are marked as used so that such devices will not be assigned again to another PCI option-ROM that doesn't belong to PCI device.

According to an embodiment of the invention, a unique combination of vendor ID and device ID is chosen for an option-ROM, and this combination will not be used by other devices to dispatch other PCI option-ROMs. Through this selection process, it can be ensured that the data associated with an option-ROM is dispatched to the system memory, even though the option-ROM does not belong to any PCI device.

The process for selecting a PCI device as a temporary target will vary according to the embodiment. According to one embodiment, a PCI device may be pre-selected before commencing operations as a temporary target for an option-ROM. According to another embodiment, a selection process may be programmed into a function that is added into a BIOS kernel so that the BIOS kernel can perform the selection automatically.

According to an embodiment of the invention, the support is provided for a non-PCI device that appears as bootable item. According to an embodiment of the invention, a process is used in a board feature. The feature includes, but is not limited to, booting an operating system (OS) in a non-PCI device. The non-PCI device may include, but is not limited to, a non-volatile memory device, such as a flash memory device. A flash memory device may store operating system data (which may be referred to as OSFLASH or FLASHOS) that may be booted according to an embodiment of the invention. According to an embodiment of the invention, a system BIOS will recognize OS data stored in flash memory as equivalent to OS data stored in hard disk memory, and thus enable the booting of the system utilizing the OS in flash.

According to an embodiment of the invention, a method is provided to dispatch an OSFLASH boot loader to provide software or firmware support for flash memory that comprises a non-PCI device. According to the embodiment, the OSFLASH boot loader is built as a PCI bootable option-ROM module. Not all PCI option-ROMs are bootable, with a special signature generally being required inside a PCI option-ROM in order for the option-ROM to be bootable. In an embodiment of the invention, a module header for an option-ROM contains a PCI device ID and vendor ID that can refer to one of the available PCI devices in the system. According to an embodiment, the BIOS kernel detects all available PCI devices and selects one of such devices to be the target of the OSFLASH boot loader. The selected PCI device then becomes a temporary target for the OSFLASH boot loader to be dispatched to system memory, with the real target of the OSFLASH boot loader being the non-PCI device flash memory.

In operation, system BIOS responsibility is to dispatch the each PCI option-ROM to system memory. The system BIOS reads each PCI device to identify the device ID and vendor ID, compares with all the option-ROM modules' device ID and vendor ID, and, if a match is found, the option-ROM is dispatched to system memory. According to an embodiment of the invention, an option-ROM of a non-PCI device is dispatched to memory in the same manner as other option-ROMs.

According to an embodiment of the invention, OSFLASH may be utilized without modifying an existing BIOS boot loader. Thus, existing BIOS logic is enabled for PCI option-ROM dispatching to dispatch the OSFLASH boot loader. OSFLASH may be utilized as a tool for embedded system end users to store customized OS in an onboard flash that shares storage with the system BIOS in the same device. The embedded OS may be supported with relatively low cost and with reduced software or firmware development effort to develop and maintain the code of a modified BIOS boot loader.

FIG. 1 is an illustration of device connections according to an embodiment of the invention. In this illustration, a controller 105 is coupled with a standard bus 110. The standard for the bus may include, but is not limited to, a PCI standard. The controller 105 is also coupled with a non-standard bus 115, with at least one non-standard device 120 being coupled with the non-standard bus 115. There are also one or more devices that comply with the standard coupled with the standard bus 110, the standard devices being illustrated as standard device 1 125 through standard device n 130. The non-standard device 120 may contain operational data for the system, such as an operating system. In one example, the non-standard device 120 comprises a non-volatile memory device, such as flash memory. The operational data for the system may be stored in the non-volatile memory. However, the operational data generally would not be initiated through the non-standard device. Under an embodiment of the invention, one of the standard devices, 125 through 130, is chosen as a temporary target for the operational data of the non-standard device 120. When the chosen standard device is read, the operational data associated with the non-standard device 120 is dispatched to memory, allowing this data to be invoked when the memory is read.

Figure 2:
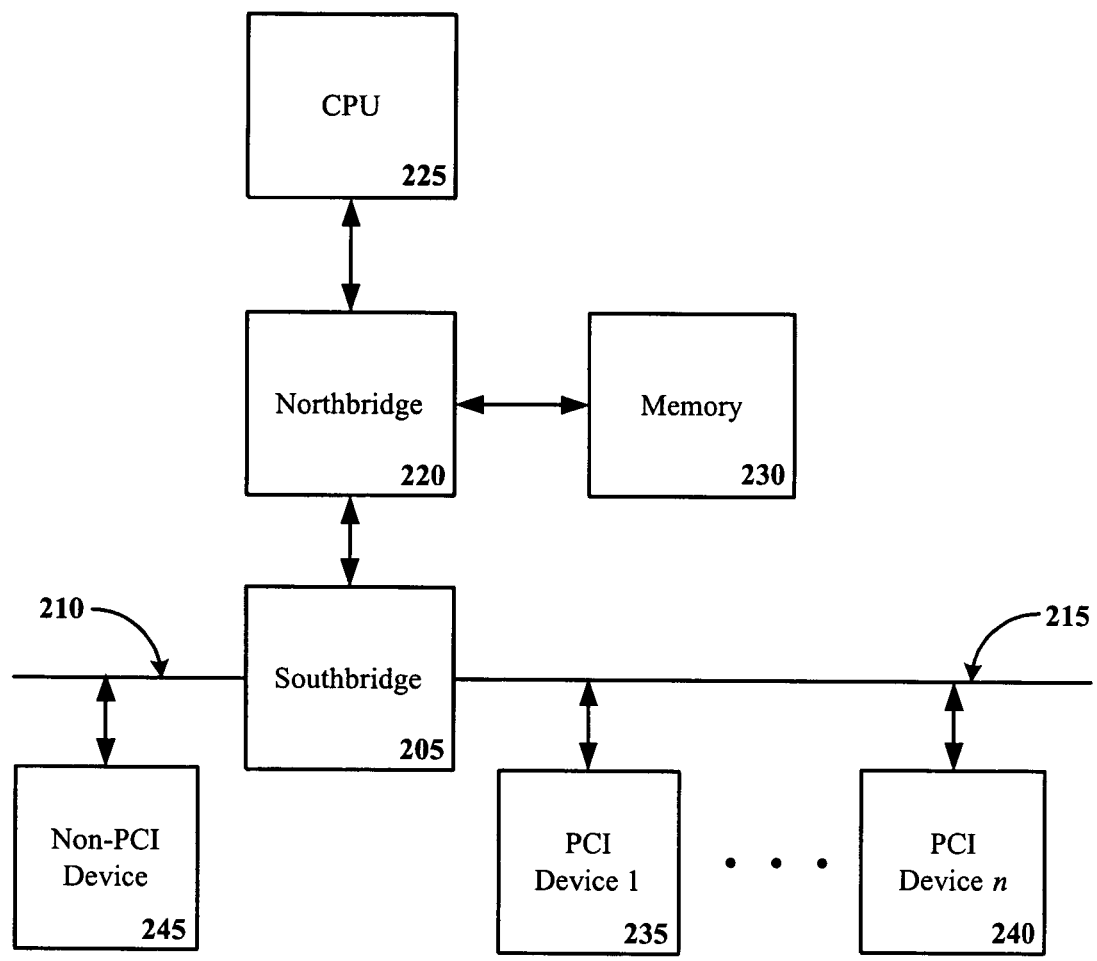
FIG. 2 illustrates an embodiment of a system configuration.

FIG. 2 is an illustration of a system according to an embodiment of the invention. In this illustration, first controller 205 is coupled with a first bus 210, which is a non-PCI bus, and with a second bus 215, which is a PCI standard bus. The first controller may comprise an input/output controller hub (ICH) that performs functions that may be described as "Southbridge" functions. The first controller 205 is coupled with a second controller 220. The second controller may be a system address and data controller that performs functions that may be referred to as "Northbridge" functions. The second controller 220 is also coupled with a central processing unit (CPU) 225 and to memory 230. One or more PCI devices, shown as PCI device 1 235 through PCI device n 240, are coupled with the PCI bus 215. A non-PCI device 245 is coupled with the non-PCI bus 210. The non-PCI device 245 may be a flash memory device or other non-volatile memory device. Certain operational data is associated with the non-PCI device 245, such as an operating system, that should be dispatched to memory or otherwise supported. The first controller 205 normally would not boot the operational data from a non-PCI device. Under an embodiment of the invention, one of the PCI devices is chosen as a temporary target for the non-PCI device 245. When the first controller 205 accesses the chosen target device, the data associated with the non-PCI device 245 is then transferred to memory 230 via the second controller 220. In an example in which the data comprises an operating system, the CPU 225 accesses the data in the memory 230 and utilizes the operating system for operations.

Figure 3:
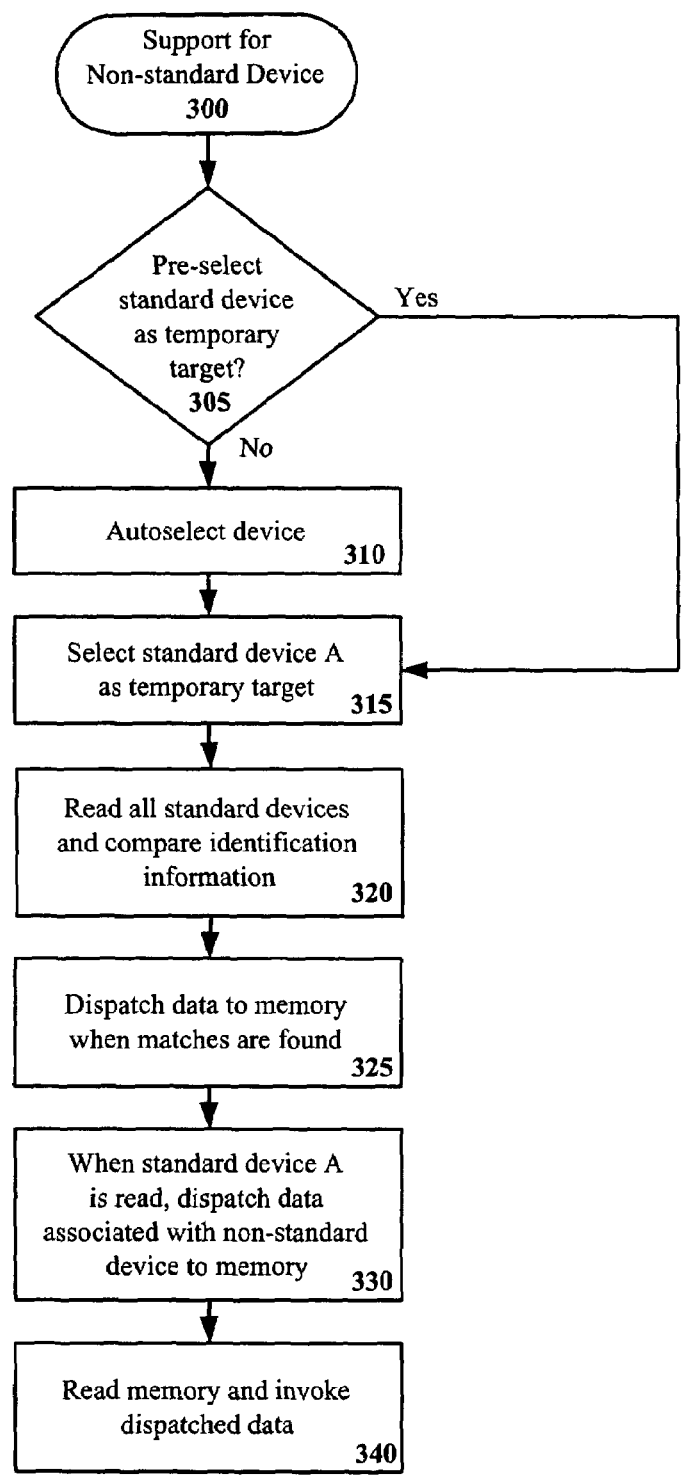
FIG. 3 is a flowchart showing an embodiment of support for a non-standard device.
Figure 4:
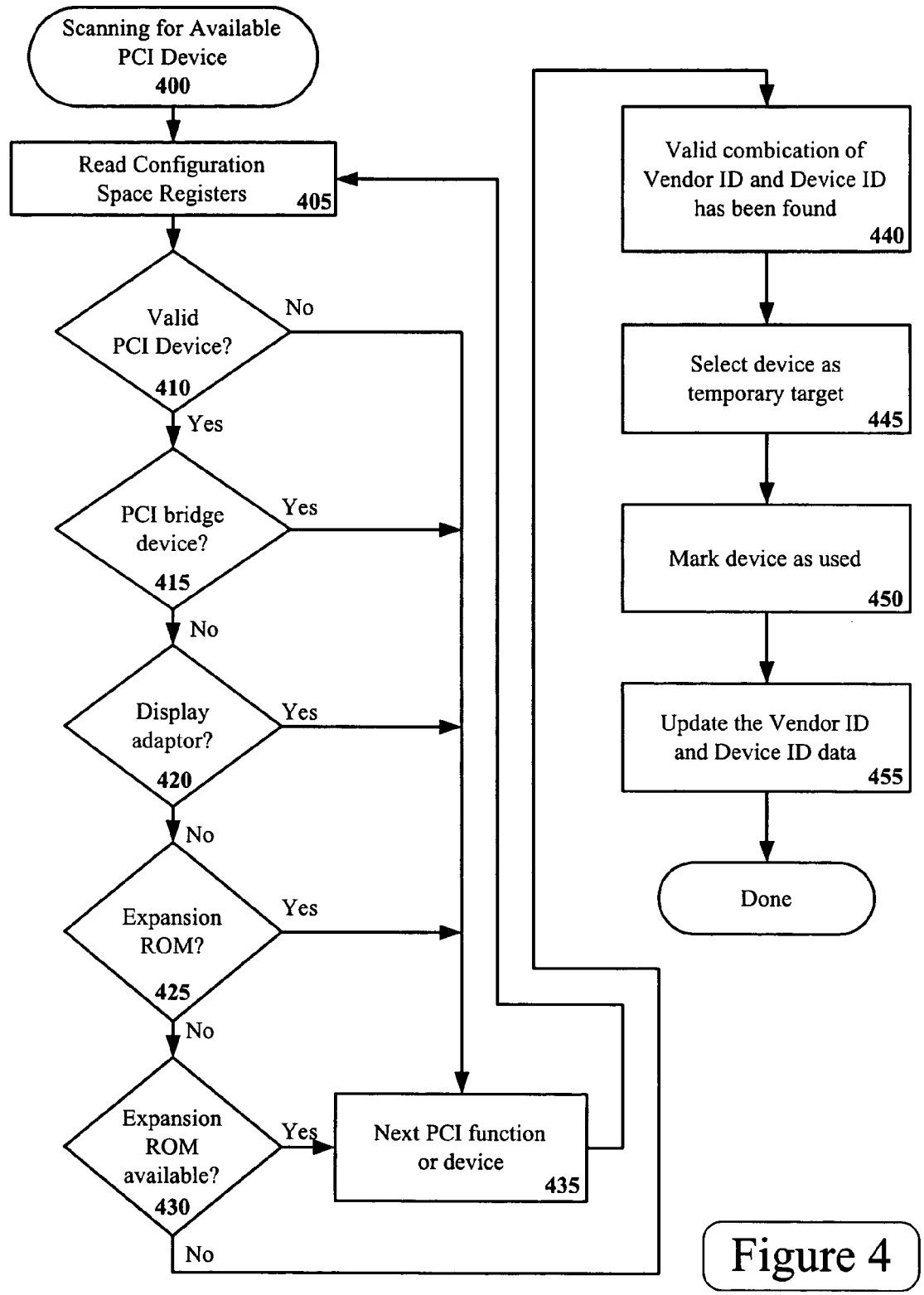
FIG. 4 is a flowchart showing an embodiment of selection of a standard device to provide support for a non-standard device.

FIG. 3 is a flowchart for support of a non-standard device 300 according to an embodiment of the invention. In this embodiment, the non-standard device contains certain data, such as an operating system. The data includes boot data, such as an OS boot loader. The boot data may be stored as an option-ROM. To support the non-standard device 300, a standard device is chosen as a temporary target for the data contained in the non-standard device. For the purposes of this illustration, it is assumed that there is a plurality of standard devices available. A determination is made whether a standard device has been pre-selected as a temporary target for the non-standard device data 305. If pre-selection has not been made, an auto-selection process is invoked 310. The auto-selection process may vary according to the particular embodiment. One example of an auto-selection process that may be implemented is illustrated in FIG. 4 below. A standard device is either pre-selected or auto-selected as the temporary target, with the selected device being designated for this illustration as standard device A 315. Each standard device is read, such as by BIOS PCI logic for a PCI bus environment, and the vendor ID and device ID for each standard device is compared to the identification information provided for data (the option-ROMs that are present) 320, including the option-ROM for the non-standard device. When there is a match between the identification information for a standard device and the identification information for option-ROM, the data for the matched device is dispatched to memory 325. In particular, when Standard Device A is read, the data associated with the non-standard device option-ROM is dispatched to memory. The data contained in the memory is then read and the dispatched data is invoked. For example, if the data associated with the non-standard device comprises an operating system, then the data is booted and provides the operating system for the environment.

FIG. 4 is a flowchart illustrating an embodiment of selection of a standard device to provide support for a non-standard device 400. In this illustration, a PCI standard is involved, but embodiments of the invention are not limited to this standard. In this illustration, each standard PCI device contained in a system is examined to identify a device that can serve as a temporary target to provide support for a non-standard device. The scanning may involve one or more buses and any number of devices for each bus. In one embodiment, the scanning is conducted sequentially through the devices, but devices can be scanned in any order. The configuration space registers of a device are read 405. There is a determination whether the device is a valid PCI device 410. If not, the scanning continues to the next PCI device 435. If the device is a valid PCI device, the scanning then continues through determinations related to the suitability of the PCI device to act as a temporary target, with such determinations being made in any order. As shown in FIG. 4, there are determinations whether the device is a PCI bridge device 415; whether the device is a display adaptor 420; whether the PCI device includes expansion ROM 425; and whether the device has already been marked as used as a temporary target 430. If any of the determinations are answered in the affirmative, the scan continues to the next device 435. If the answers to all of the determinations are negative, then a valid combination of vendor ID and device ID has been located 440 and the PCI device is chosen as a temporary target for the non-PCI device 445. The device is marked as used 450, which prevents the use of the device as a temporary target for any other non-PCI device. The vendor ID and device ID for the option-ROM of the non-PCI device are updated with the vendor ID and device ID for the selected PCI device and the option-ROM checksum is updated 455, thereby enabling the dispatch of the option-ROM data to memory.

Figure 5:
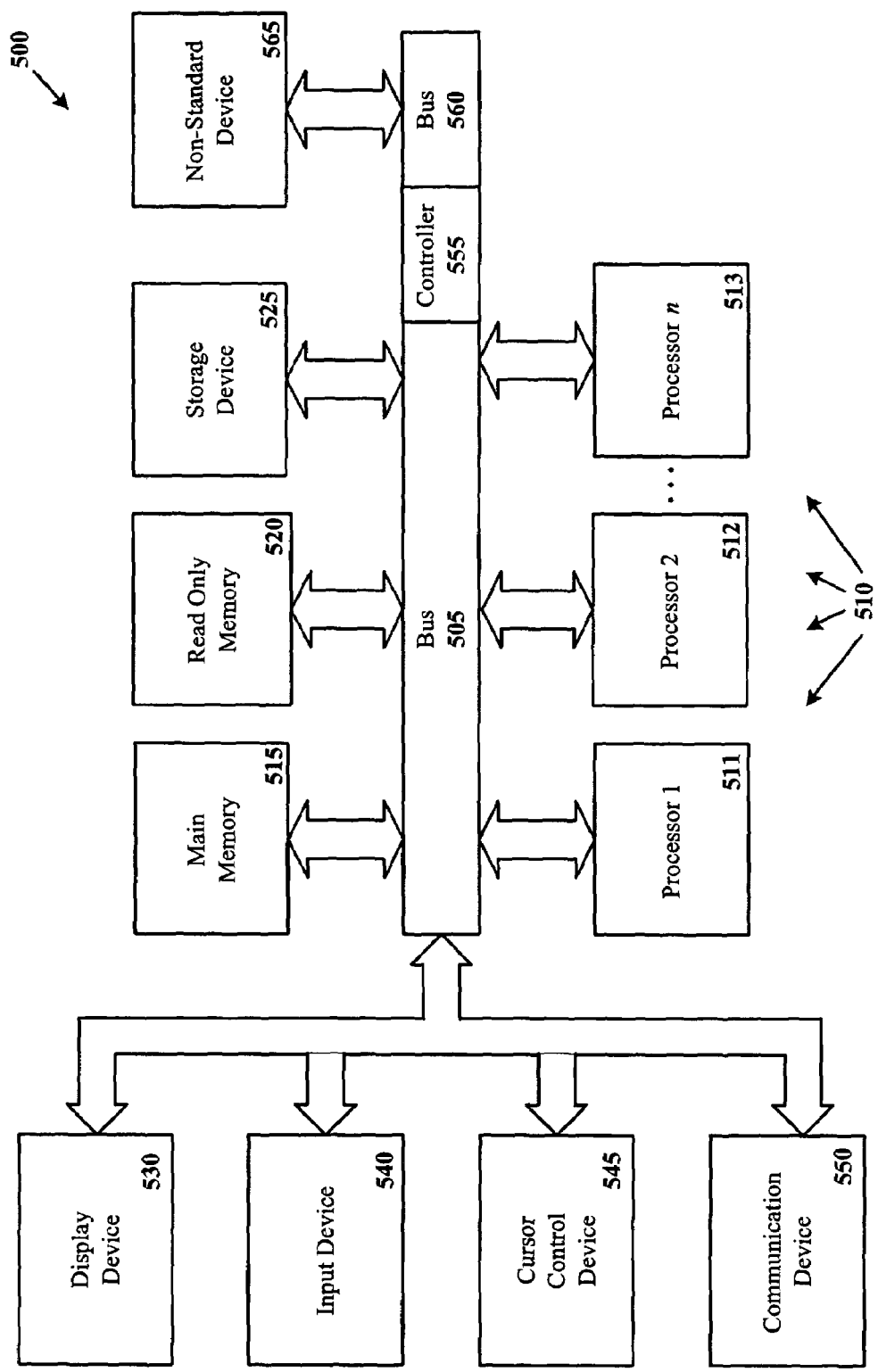
FIG. 5 is an embodiment of a computer.

Techniques described here may be used in many different environments. FIG. 5 is block diagram of an exemplary computer that can be used in conjunction with an embodiment of the invention. Under an embodiment of the invention, the computer may comprise an embedded system or other special purpose computer. An embedded system or other special purpose computer may operate without certain of the components and features described herein.

Under an embodiment of the invention, a computer 500 comprises a first bus 505 or other communication means for communicating information, and a processing means such as one or more processors 510 (shown as 511, 512 and continuing through 513) coupled with the first bus 505 for processing information. The first bus is a bus in compliance with a standard.

The computer 500 further comprises a random access memory (RAM) or other dynamic storage device as a main memory 515 for storing information and instructions to be executed by the processors 510. Main memory 515 also may be used for storing temporary variables or other intermediate information during execution of instructions by the processors 510. The computer 500 also may comprise a read only memory (ROM) 520 and/or other static storage device for storing static information and instructions for the processor 510.

A data storage device 525 may also be coupled to the first bus 505 of the computer 500 for storing information and instructions. The data storage device 525 may include a magnetic disk or optical disc and its corresponding drive, flash memory or other nonvolatile memory, or other memory device. Such elements may be combined together or may be separate components, and utilize parts of other elements of the computer 500.

According to an embodiment of the invention, a non-standard second bus 560 is included. A bus controller 555 controls bus operations. A non-standard device 565 is coupled to the second bus 560. The non-standard device 565 may include, but is not limited to, a non-volatile memory device, including a flash memory device. In one embodiment, an operating system for the computer 500 is stored on the non-standard device 565.

The computer 500 may also be coupled via the first bus 505 to a display device 530, such as a liquid crystal display (LCD) or other display technology, for displaying information to an end user. In some environments, the display device may be a touch-screen that is also utilized as at least a part of an input device. In some environments, display device 530 may be or may include an auditory device, such as a speaker for providing auditory information. An input device 540 may be coupled to the bus 505 for communicating information and/or command selections to the processor 510. In various implementations, input device 540 may be a keyboard, a keypad, a touch-screen and stylus, a voice-activated system, or other input device, or combinations of such devices. Another type of user input device that may be included is a cursor control device 545, such as a mouse, a trackball, or cursor direction keys for communicating direction information and command selections to processor 510 and for controlling cursor movement on display device 530.

A communication device 550 may also be coupled to the first bus 505. Depending upon the particular implementation, the communication device 550 may include a transceiver, a wireless modem, a network interface card, or other interface device. The computer 500 may be linked to a network or to other devices using the communication device 550, which may include links to the Internet, a local area network, or another environment.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A circuit comprising:
a first device coupled with a first bus, wherein the first device is not compliant with a PCI (peripheral component interconnect) standard, the first device containing operating system data, wherein the operating system data is not bootable for any device that is not compliant with the PCI standard according to a system BIOS (basic input output system);
a second device coupled with a second bus, wherein the second device is compliant with the PCI standard and the second bus is a PCI standard bus, the second device to be associated with the operating system data from the first device, the association of the second device with the operating system data from the first device enabling the operating system data from the first device to be booted according to the PCI standard; and
a memory to receive the operating system data from the first device.

2. The circuit of claim 1, further comprising a plurality of devices coupled with the second bus, wherein each of the plurality of devices is compliant with the PCI standard, and wherein the plurality of devices includes the second device.

3. The circuit of claim 2, further comprising a controller coupled with the first bus and the second bus to scan the plurality of PCI standard devices to identify the second device.

4. The circuit of claim 3, further comprising a second controller coupled with the controller and the memory, wherein the memory receives the operating system data via the second controller.

5. The circuit of claim 1, wherein the second device comprises a function of a physical device.

6. The circuit of claim 1, wherein the first device comprises flash memory.

7. The circuit of claim 1, wherein the operating system data includes a boot loader, the boot loader being stored as an option-ROM for the first device.

8. A method comprising:
identifying a peripheral device that is coupled with a first bus, the peripheral device being a standard peripheral device according to a PCI (peripheral component interconnect) standard;
associating the standard peripheral device with operating system data of a non-standard peripheral device that is coupled with a second bus, wherein the operating system data is not bootable for any non-standard peripheral device according to a system BIOS (basic input output system); and
based on the association of the PCI standard peripheral device with the operating system data of the non-standard peripheral device, dispatching the operating system data of the non-standard peripheral device to memory as data in accordance with the PCI standard.

9. The method of claim 8, wherein identifying the standard peripheral device comprises choosing the standard peripheral device from a plurality of standard peripheral devices that are coupled with the first bus.

10. The method of claim 9, wherein choosing the standard peripheral device comprises pre-selecting the standard peripheral device before commencing operations.

11. The method of claim 9, wherein choosing the standard peripheral device comprises scanning the plurality of standard peripheral devices coupled with the first bus to identify a suitable device.

12. The method of claim 11, wherein the scanning of the plurality of standard peripheral devices is performed by a first controller that is coupled with the first bus and the second bus.

13. The method of claim 12, wherein the dispatching of the operating system data to memory comprises transferring the operating system data to memory via a second controller that is coupled with the memory and the first controller.

14. The method of claim 9, wherein the operating system data includes a boot loader, the boot loader being stored as an option-ROM.

15. A computer system comprising:
a processor;
a first bus, the first bus being in compliance with a PCI (peripheral component interconnect) standard;
a first device that is not compliant with the PCI standard, the first device being coupled with a second bus, the first device containing operating system data, wherein the operating system data is not bootable for the computer system with any device that is not compliant with the PCI standard according to a BIOS (basic input output system) of the computer system;

a plurality of devices in compliance with the PCI standard, each of the plurality of devices being coupled with the first bus, the plurality of devices including a second device to be associated with the operating system data from the first device, the processor recognizing the operating system data as being operating system data in accordance with the PCI standard because of the association of the second device with the operating system data; and a memory to receive the operating system data from the first device.

16. The computer system of claim 15, wherein the computer system is an embedded system.

17. The computer system of claim 15, further comprising a controller coupled with the first bus and the second bus to scan the plurality of devices in compliance with the PCI standard to identify the second device.

18. The computer system of claim 17, further comprising a second controller coupled with the controller and the memory, wherein the memory receives the operating system data via the second controller.

19. The computer system of claim 15, wherein the plurality of devices includes one or more functions of a physical device.

20. The computer system of claim 15, wherein the first device comprises flash memory.

21. The computer system of claim 15, wherein a portion of the data is stored as an option-ROM for the first device.

22. A computer-readable storage medium having stored thereon data representing sequences of instructions that, when executed by a processor, cause the processor to perform operations comprising:

identifying a PCI (peripheral component interconnect) standard peripheral device on a first bus;

associating the PCI standard peripheral device with operating system data contained in a non-standard peripheral device, wherein the operating system data is not bootable for any non-standard peripheral device according to a system BIOS (basic input output system); and based on the association of the PCI standard peripheral device with the operating system data of the non-standard peripheral, dispatching the operating system data of the non-standard device to memory as data in accordance with the PCI standard.

23. The storage medium of claim 22, wherein identifying the PCI standard peripheral device comprises choosing the PCI standard peripheral device from a plurality of standard peripheral devices on the first bus.

24. The storage medium of claim 23, wherein choosing the PCI standard peripheral device comprises pre-selecting the PCI standard peripheral device before commencing operations.

25. The storage medium of claim 23, wherein choosing the PCI standard peripheral device comprises scanning the plurality of standard peripheral devices on the first bus to identify a suitable device.

26. The storage medium of claim 23, wherein the choice of the PCI standard peripheral devices from the plurality of standard peripheral devices is performed by a first controller that is coupled with the first bus and the second bus.

27. The storage medium of claim 26, wherein the dispatching of the operating system data to memory comprises transferring the operating system data to memory via a second controller that is coupled with the memory and the first controller.

28. The storage medium of claim 22, wherein the operating system data includes a boot loader, the boot loader being stored as an option-ROM.

* * * * *